(12) United States Patent
Spoelstra et al.

(10) Patent No.: US 11,421,459 B2
(45) Date of Patent: Aug. 23, 2022

(54) FOUR-BAR LINKAGE HINGE

(71) Applicant: HARTWELL CORPORATION, Placentia, CA (US)

(72) Inventors: Brandon L. Spoelstra, Tustin, CA (US); Michael A. Grande, Chino, CA (US)

(73) Assignee: Hartwell Corporation, Placentia, CA (US)

( * ) Notice: Subject to any disclaimer, the term of this patent is extended or adjusted under 35 U.S.C. 154(b) by 163 days.

(21) Appl. No.: 17/013,745

(22) Filed: Sep. 7, 2020

(65) Prior Publication Data

US 2020/0399942 A1 Dec. 24, 2020

Related U.S. Application Data

(63) Continuation of application No. 15/885,441, filed on Jan. 31, 2018, now Pat. No. 10,767,404.

(60) Provisional application No. 62/452,862, filed on Jan. 31, 2017.

(51) Int. Cl.
| | |
|---|---|
| *E05D 7/00* | (2006.01) |
| *E05D 3/06* | (2006.01) |
| *E05D 5/06* | (2006.01) |
| *B64D 29/08* | (2006.01) |

(Continued)

(52) U.S. Cl.
CPC ............... *E05D 7/00* (2013.01); *B64D 29/08* (2013.01); *E05D 3/06* (2013.01); *E05D 3/14* (2013.01); *E05D 5/06* (2013.01); *E05F 1/1207* (2013.01); *E05D 2005/067* (2013.01); *E05F 1/1215* (2013.01); *E05Y 2201/484* (2013.01); *E05Y 2900/502* (2013.01)

(58) Field of Classification Search
CPC .... E05D 7/00; E05D 3/06; E05D 3/14; E05D 3/145; E05D 3/147; E05D 5/06; E05D 2005/067; B64D 29/08; E05F 1/1207; E05F 1/1215; E05Y 2201/484; E05Y 2900/502

See application file for complete search history.

(56) References Cited

U.S. PATENT DOCUMENTS

| | | | |
|---|---|---|---|
| 2,570,479 A | 10/1951 | Pollman | |
| 2,621,359 A | 12/1952 | Schuyler | |
| 2,730,394 A | 1/1956 | Price | |

(Continued)

FOREIGN PATENT DOCUMENTS

| | | |
|---|---|---|
| EP | 0402235 | 12/1990 |
| WO | WO 2011/063441 | 6/2011 |

OTHER PUBLICATIONS

Hinge Selection Guide, DAH Series, Hartwell Corp. (1991).
Search Report and Written Opinion issued in App. No. PCT/US2018/016248 (2018).

*Primary Examiner* — Rodney A Bonnette
(74) *Attorney, Agent, or Firm* — Barnes & Thornburg LLP

(57) ABSTRACT

A hinge is coupled to a first component and a second component. The hinge supports the second component for movement relative to the first component between a closed position covering an opening through the first component and an opened position displaced from the opening. The hinge includes a first bracket coupled to the second component, a second bracket coupled to the first component, a support link coupled to the first and second brackets, and a control link coupled to the first and second brackets. Rotation of the support link relative to the first bracket causes rotation of the first component relative to the second component and relative to the support link.

16 Claims, 8 Drawing Sheets

(51) Int. Cl.
*E05F 1/12* (2006.01)
*E05D 3/14* (2006.01)

(56) References Cited

U.S. PATENT DOCUMENTS

| | | |
|---|---|---|
| 3,085,297 A | 8/1963 | Linderfelt |
| 3,183,548 A | 5/1965 | Speakman |
| 3,791,073 A | 2/1974 | Baker |
| 4,199,120 A | 4/1980 | Bergman et al. |
| 4,383,347 A | 5/1983 | La Conte |
| 4,383,392 A | 5/1983 | La Conte |
| 4,549,671 A | 10/1985 | Fay, III |
| 4,854,010 A | 8/1989 | Maraghe et al. |
| 5,068,946 A | 3/1991 | Marescot et al. |
| 5,493,760 A | 2/1996 | Takimoto |
| 6,116,542 A | 9/2000 | Erben |
| 6,382,705 B1 | 5/2002 | Lang et al. |
| 6,454,210 B1 | 9/2002 | Plattner |
| 6,457,677 B2 | 10/2002 | Dazet |
| 6,618,904 B1 | 9/2003 | Nagy |
| 6,834,834 B2 | 12/2004 | Dazet et al. |
| 7,137,174 B2 | 11/2006 | Derbis et al. |
| 7,802,345 B2 | 9/2010 | Mathew et al. |
| 2012/0325123 A1 | 12/2012 | Schoerkhuber et al. |
| 2015/0259960 A1 | 9/2015 | Smith |
| 2015/0344122 A1 | 12/2015 | Carsten et al. |
| 2017/0234046 A1 | 8/2017 | Shepherd |
| 2018/0195328 A1 | 7/2018 | Gorenbacher |

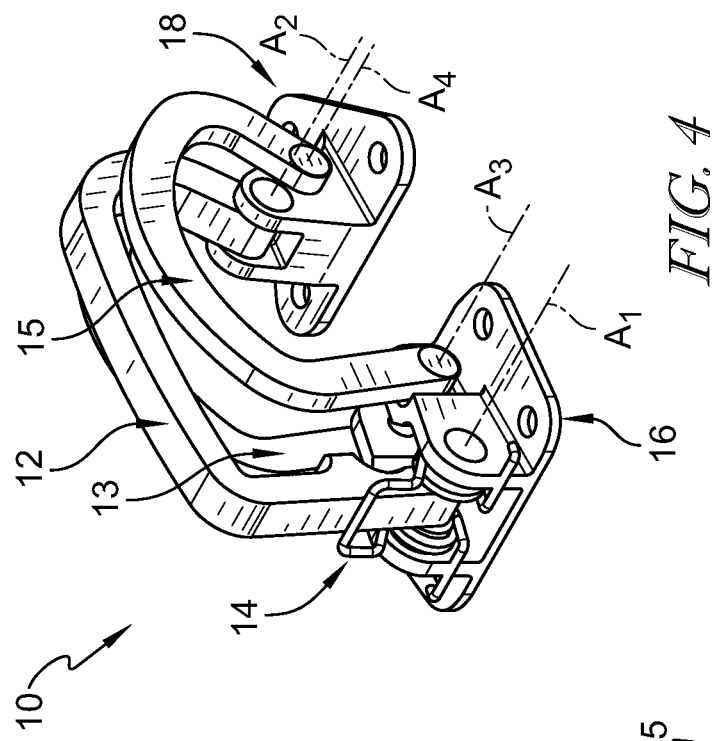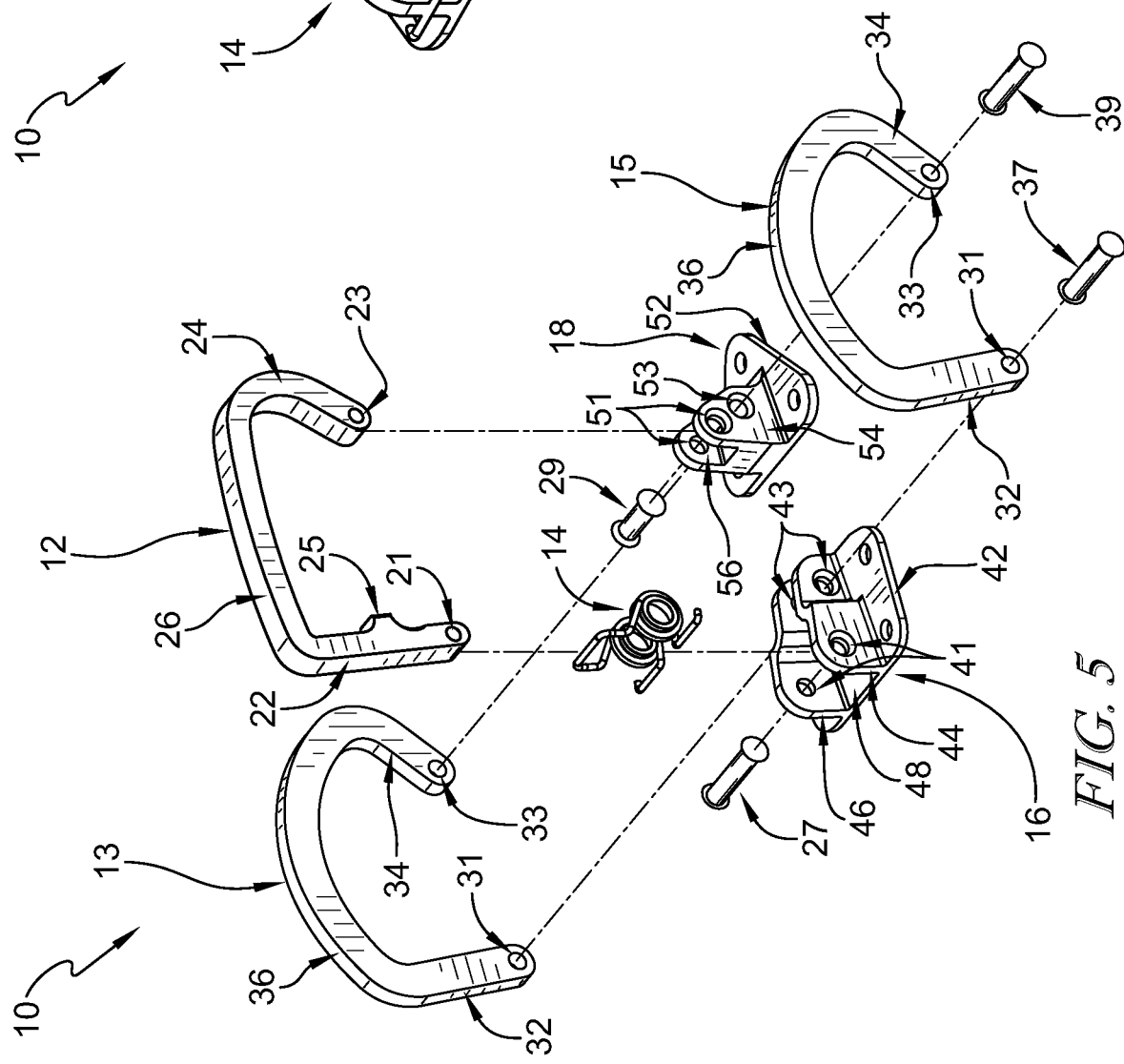

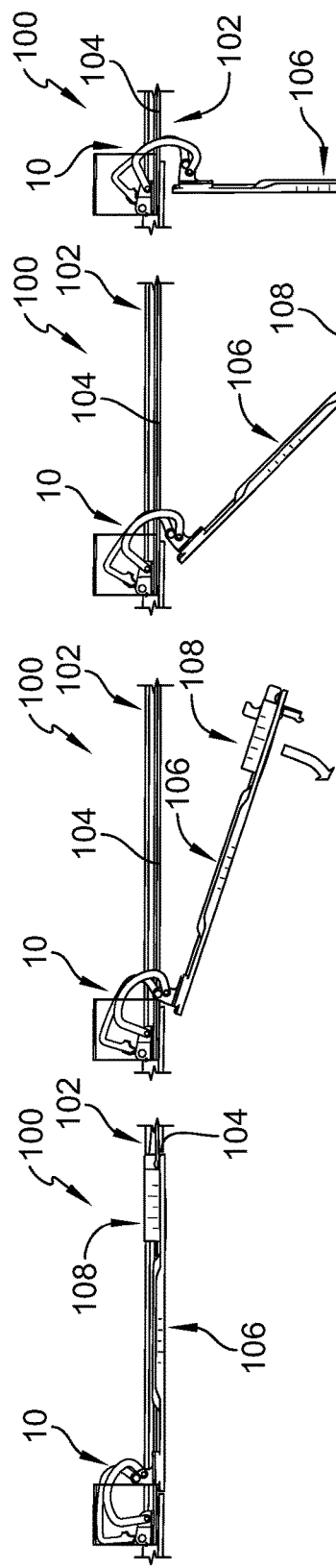

FOUR-BAR LINKAGE HINGE

CROSS-REFERENCE TO RELATED APPLICATION

This application is a Continuation of U.S. application Ser. No. 15/885,441, filed Jan. 31, 2018, which claims benefit under 35 U.S.C. § 119 of U.S. Provisional Patent Application No. 62/452,862, filed on Jan. 31, 2017. The disclosures set forth in the referenced applications are incorporated herein by reference in their entirety.

BACKGROUND

A variety of hinge structures have been developed for the aerospace industry to allow doors or access panels to be selectively closed and opened relative to the aircraft structure. Plate hinges used in home construction, for example, allow a door to open for access generally 90 degrees and sometimes up to 180 degrees relative to the plate hinge mounting point (door frame). However, in the aerospace industry, hinges usually need to be attached in a manner such that the hinges are completely concealed inside the body of the aircraft. In other words, hinges cannot be exposed to the exterior of the aircraft while the door or access panel is closed. Additionally, there are design constraints relative to some hinge designs such as the internal and external operating envelope space, weight consideration, and installation issues.

This background information is merely provided for context, and no admission is intended, nor should such admission be inferred or construed, that any of the preceding information constitutes prior art to the present disclosure.

SUMMARY

According to the present disclosure, a hinge is coupled to a first component and a second component. The hinge supports the first component for movement relative to the second component between a closed position covering an opening through the second component and an opened position displaced from the opening.

In illustrative embodiments, the hinge is a four-bar linkage hinge and includes a first bracket, a second bracket spaced apart from the first bracket, a support link coupled to the first bracket for rotation about a first axis and coupled to the second bracket for rotation about a second axis, and a control link coupled to the first bracket for rotation about a third axis and coupled to the second bracket for rotation about a fourth axis. The first, second, third, and fourth axes are spaced apart from one another such that rotation of the support link relative to the first bracket causes rotation of the first component relative to the second component and relative to the support link.

In illustrative embodiments, the support link and the control link each include a first arm and a spaced apart second arm coupled together by a neck, wherein the first arms are coupled to the first bracket and the second arms are coupled to the second bracket. The first bracket includes a base and a pair of spaced apart flanges extending outward from the base to define a channel therebetween. The first arm of the support link is received in the channel, and the first arm of the control link is positioned along one of the flanges outside of the channel. The second bracket includes a base and a column extending outward from the base, and a slot is formed at an opposing end of the column from the base. The second arm of the support link is received in the slot, and the second arm of the control link is positioned along the column outside of the slot.

In illustrative embodiments, rotation of the support link relative to the first bracket by about 70 degrees to about 80 degrees results in a rotation of the first component through an angle of about 160 degrees to about 180 degrees from the closed position to the opened position.

In illustrative embodiments, a spring is engaged with the first bracket and the support link and configured to bias the first component toward the opened position.

BRIEF DESCRIPTION OF THE DRAWINGS

The present disclosure will be described hereafter with reference to the attached drawings which are given as a non-limiting example only, in which:

FIG. 4 is a rear perspective view of the four-bar linkage hinge of FIG. 1 showing that the support link is coupled to the body bracket and the door bracket for rotation about a first set of axes and that the control links are coupled to the body bracket and the door bracket for rotation about a second set of axes spaced apart from the first set of axes;

FIG. 5 is an exploded assembly view of the four-bar linkage hinge of FIG. 4;

FIGS. 7-14 are a series of views illustrating movement of the access door from the closed position to the opened position;

Figure 1:
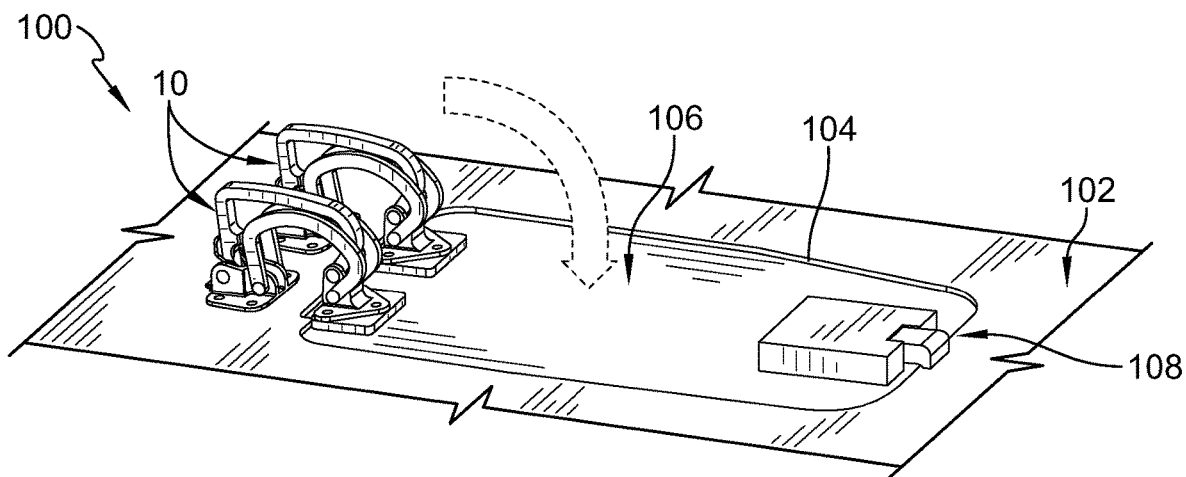
FIG. 1 is a perspective view of a portion of an airframe showing an access door coupled to a body panel by a pair of four-bar linkage hinges in accordance with the present disclosure and suggesting that the four-bar linkage hinges allow the access door to move relative to the body panel from a closed position covering an opening through the body panel, as shown in FIG. 1, to an opened position displaced from the opening, as suggested in FIGS. 2 and 3.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

A portion of an airframe 100 having an access door 106 coupled to a body panel 102 by four-bar linkage hinges 10 in accordance with the present disclosure is shown in FIG. 1. Access panel 106 is shown in a closed position covering an opening 104 through body panel 102 in FIG. 1. A latch 108 engages with body panel 102 to hold access door 106 in the closed position at the selection of an operator.

Figure 2:
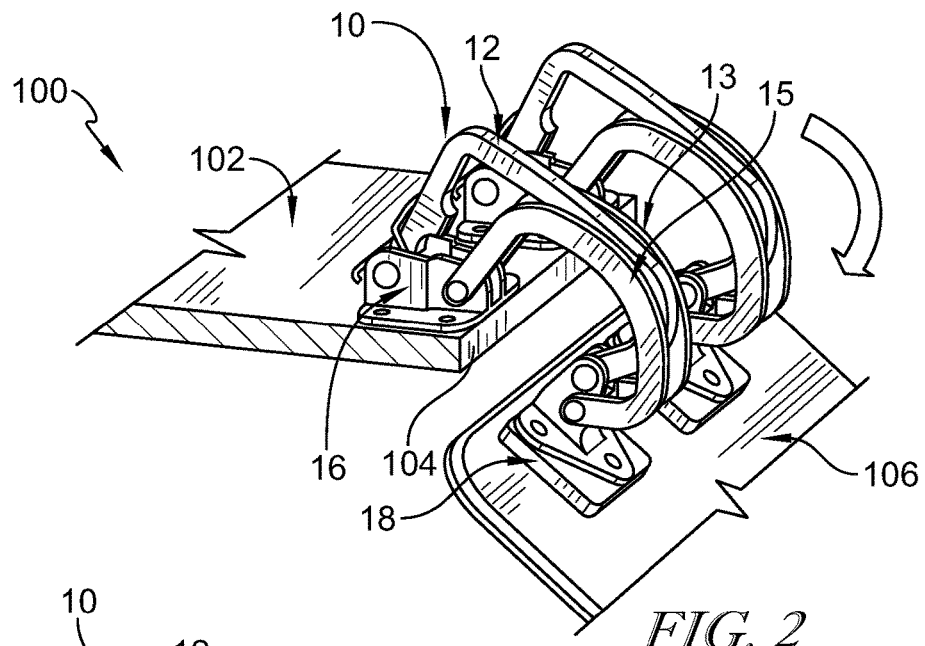
FIG. 2 is an enlarged view of FIG. 1 showing that each four-bar linkage hinge includes a central support link and outer control links coupled between a body bracket and a door bracket and suggesting that the four-bar linkage hinges rotate the access door relative to the body panel and relative to the hinges to increase a range of motion of the access door as suggested in FIG. 3.
Figure 3:
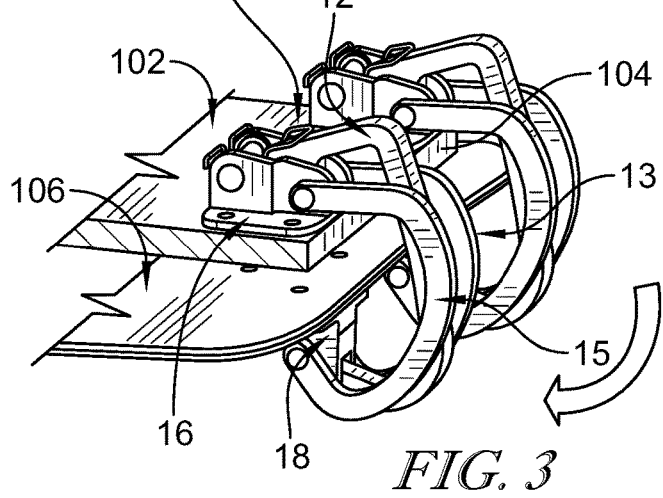
FIG. 3 is a view similar to FIG. 3 showing the access door in the opened position and extending along the body panel away from the opening.

Hinges 10 are configured to allow access door 106 to move from the closed position, shown in FIG. 1, to an opened position as suggested in FIGS. 2 and 3. In the illustrative embodiment, access door 106 extends along body panel 102 and away from opening 104 in the opened position. Each four-bar linkage hinge 10 includes a central support link 12 and outer control links 13, 15 coupled between a body bracket 16 and a door bracket 18. Body bracket 16 is secured to body panel 102 (such as with fasteners) and door bracket 18 is secured to access door 106 (such as with fasteners). In some embodiments, more or less support links 12 and control links 13, 15 can be used for strength and alignment, but at least one support link 12 and at least one control link 13, 15 are used in each hinge 10 for coordinating movement of access door 106 between the closed and opened positions as further explained below.

Figure 6:
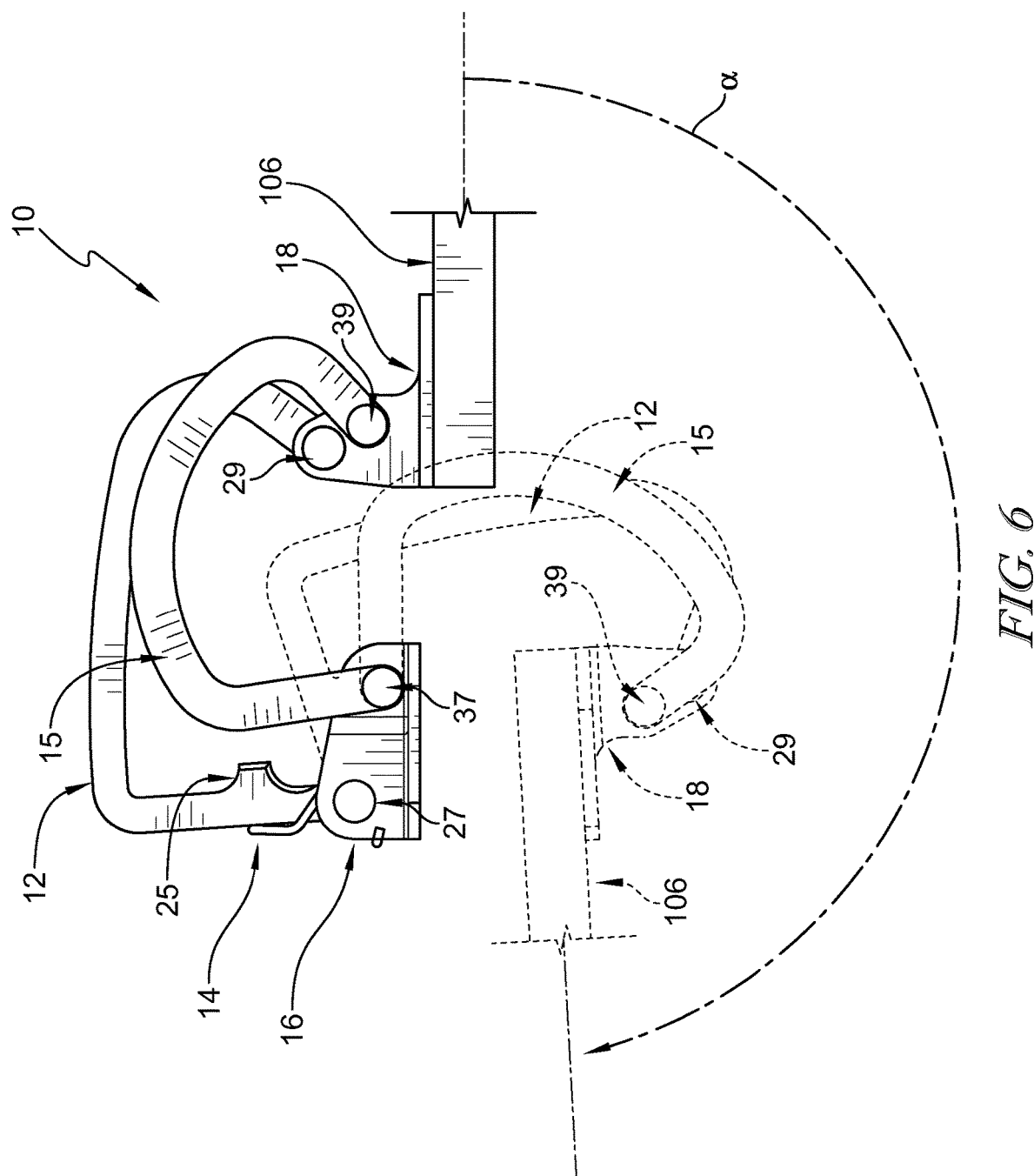
FIG. 6 is a side elevation view of the four-bar linkage hinge and access door from FIG. 1 showing the access door in the closed position and suggesting that the access door moves through an angle (a) to the opened position (shown in phantom)

Links 12, 13, 15 are rotatable relative to body bracket 16 about axes $A_1$, $A_3$, respectively, and door bracket 18 is rotatable relative to links 12, 13, 15 about axes $A_2$, $A_4$, respectively, as suggested in FIG. 4. Axes $A_1$, $A_2$, $A_3$, $A_4$ are offset from one another to allow door bracket 18 (and attached access door 106) to rotate relative to links 12, 13, 15 as links 12, 13, 15 rotate relative to body bracket 16 attached to body panel 102. In some embodiments, a rotation of support link 12 about axis $A^1$ by about 70 degrees to about 80 degrees results in a rotation of access door 106 through an angle α of about 160 degrees to about 180 degrees from the closed position to the opened position as suggested in FIG. 6. The relative positions of axes $A_1$, $A_2$, $A_3$, $A_4$ and relative sizes of links 12, 13, 15 can be adjusted to adjust rotation angle α of access door 106.

In the illustrative embodiments, two hinges 10 are attached to body panel 102 and access door 106 as shown in FIG. 1. Axes $A_1$, $A_2$, $A_3$, $A_4$ of each hinge are parallel to one another to so that opening of access door 106 is smooth. In some embodiments, more or less hinges 10 can be used for different sized access doors.

Hinges 10 allow for an extended range of motion of access door 106 while being attached on an inside of airframe 100 as suggested in FIGS. 1-3. In some embodiments, access door 106 is opened by an operator positioned outside of airframe 100 to allow the operator to engage with other components inside airframe 100 through opening 104. For example, body panel 102 may be part of an engine nacelle, and access door 106 allows the operator to add or remove lubricating oil to an engine positioned inside the nacelle through opening 104. In some embodiments, at least a portion of latch 108 may be accessible from outside airframe 100 in order to allow the operator to release latch 108 for opening access door 106.

Hinges 10 allow an extended range of motion for access door 106 to minimize a profile of access door 106 in the opened position so that access door 106 is out of the path of other moving components as suggested in FIGS. 7-14. For example, an operator may be required to open other access doors adjacent to access door 106 as part of a maintenance or repair operation. The low profile of access door 106 in the opened position can also allow lifts or other equipment to be placed closer to body panel 102.

In the illustrative embodiment, support link 12 includes a rear arm 22 and a forward arm 24 connected together by a neck 26 as shown in FIG. 5. Holes 21, 23 are formed through arms 22, 24, respectively. A stop projection 25 extends from arm 22 toward arm 24 and is configured to engage with another portion of hinge 10 (such as a fastener 39) to block further rotation of access door 106 beyond the opened position. Each control link 13, 15 includes a rear arm 32 and a forward arm 34 connected together by a neck 36. Holes 31, 33 are formed through arms 32, 34, respectively. The configurations of links 12, 13, 15 allow links 12, 13, 15 to reach out and around opening 104 to position door bracket 18 (and attached access door 106) along an outside of body panel 102 as suggested in FIGS. 1-3.

Body bracket 16 includes a base 42 and spaced apart flanges 44, 46 extending upward from base 42 to define a channel 48 as shown in FIG. 5. Rear holes 41 and forward holes 43 are formed through flanges 44, 46. Door bracket 18 includes a base 52 and a column 54 extending upward from base 52. A slot 56 is formed through an upper portion of column 54. Holes 51 are formed through column 54 and extend across slot 56. A hole 53 extends through column 54 below slot 56.

In one illustrative embodiment, each hinge 10 is assembled as shown in FIG. 5. Arm 22 of support link 12 and a spring 14 are received in channel 48 of body bracket 16. A fastener 27 (such as a rivet) extends through hole 21 of support link 12, through spring 14, and through holes 41 of body bracket 16 to connect support link 12 and spring 14 with body bracket 16. Support link 12 rotates about fastener 27 relative to body bracket 16. Spring 14 engages with body bracket 16 and support link 12 to bias hinge 10 and access door 106 toward the opened position.

Arms 32 of control links 13, 15 are arranged along outer portions of flanges 44, 46 as suggested in FIG. 5. A fastener 37 (such as a rivet) extends through holes 31 of control links 13, 15 and through holes 43 of body bracket 16 to connect control links 13, 15 with body bracket 16. Control links 13, 15 rotate about fastener 37 relative to body bracket 16.

Arm 24 of support link 12 is received in slot 56 of door bracket 18, and a fastener 29 (such as a rivet) extends through hole 23 and through holes 51 to connect support link 12 with door bracket 18 as suggested in FIG. 5. Door bracket 18 rotates about fastener 29 relative to support link 12. Arms 34 of control links 13, 15 are arranged along outer portions of column 54, and a fastener 39 (such as a rivet) extends through holes 33 and through holes 53 to connect control links 13, 15 with door bracket 18. Door bracket 18 rotates about fastener 39 relative to control links 13, 15.

In one illustrative embodiment, hinges 10 are configured to move access door 106 through a path as suggested in FIGS. 7-14. In the closed position, shown in FIG. 7, access door 106 is received in opening 104 to block access to an interior of airframe 100 through opening 104. In the opened position, shown in FIG. 14, hinges 10 can block further rotation of access door 106 so that a handle portion of latch 108 is spaced apart from body panel 102 and does not contact body panel 102. In some embodiments, airframe 100 is arranged such that access door 106 can move through a larger or shorter range of motion than illustrated in FIGS. 7-14. In the illustrative embodiment, hinges 10 provide complex rotational motion of access door 106 relative to body panel 102 much like a reverse folding action to position access door 106 in a low profile position along body panel 102 in the opened position.

Figure 15:
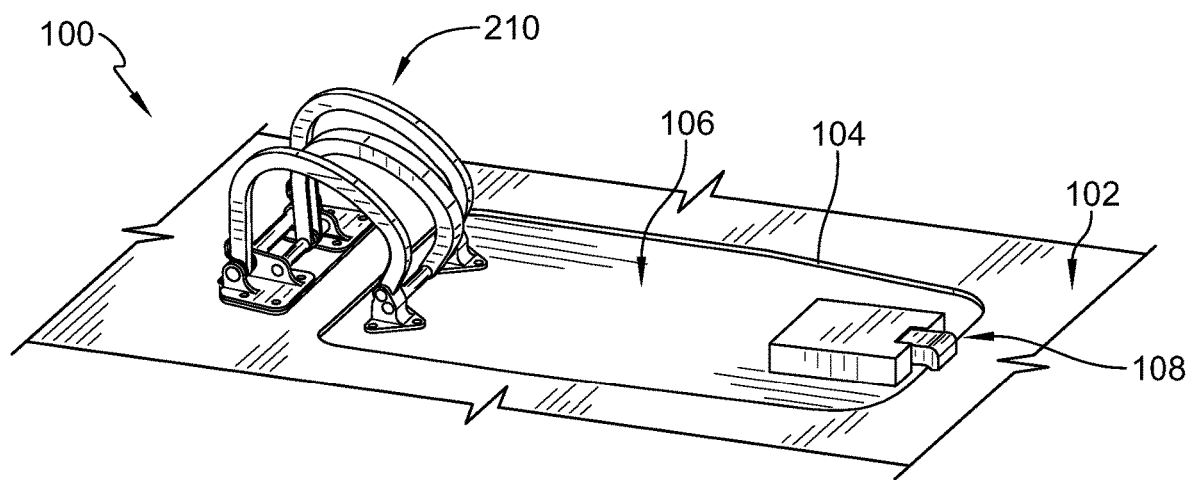
FIG. 15 is a perspective view of a portion of an airframe showing an access door coupled to a body panel by another embodiment of a four-bar linkage hinge in accordance with the present disclosure and suggesting that the four-bar linkage hinge allows the access door to move relative to the body panel from a closed position covering an opening through the body panel, as shown in FIG. 15, to an opened position displaced from the opening, as suggested in FIGS. 21-24.
Figure 16:
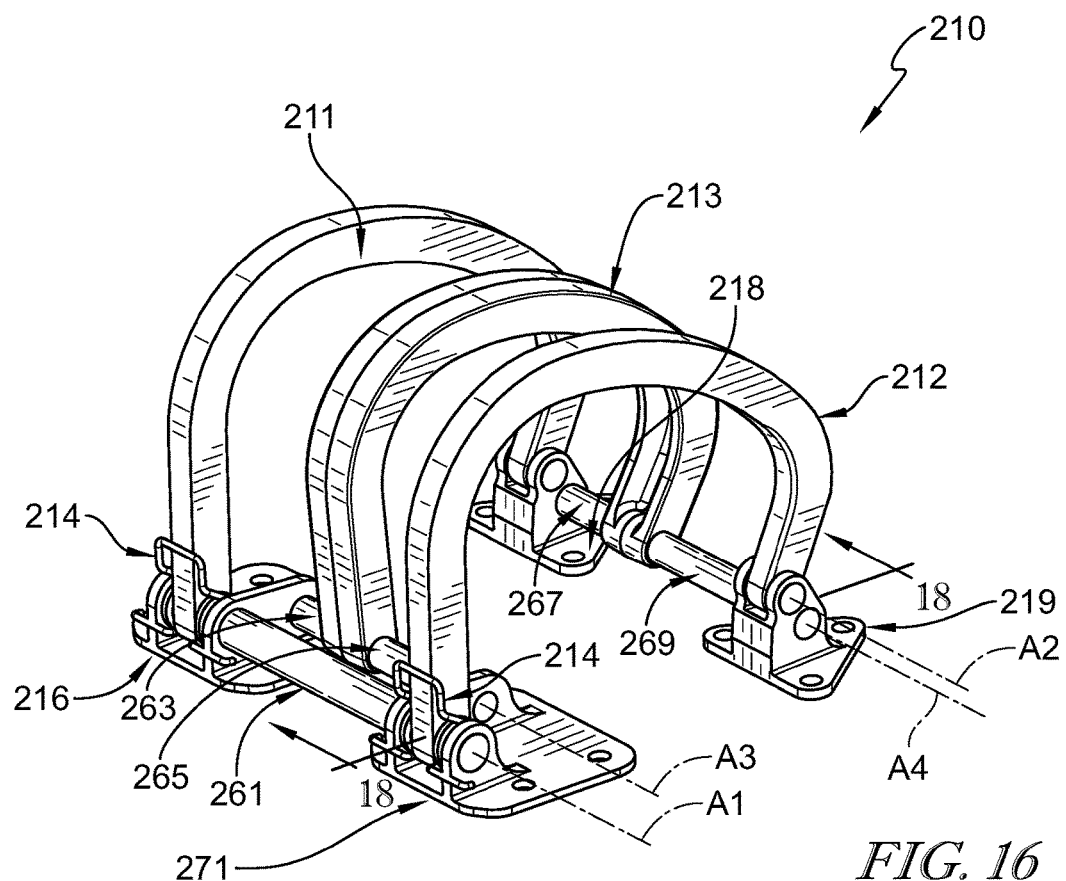
FIG. 16 is a rear perspective view of the four-bar linkage hinge of FIG. 1 showing that the four-bar linkage hinge includes a central control link and outer support links coupled between body brackets and door brackets and suggesting that the support links are coupled to the body brackets and the door brackets for rotation about a first set of axes and that the control link is coupled to the body brackets and the door brackets for rotation about a second set of axes spaced apart from the first set of axes.
Figure 17:
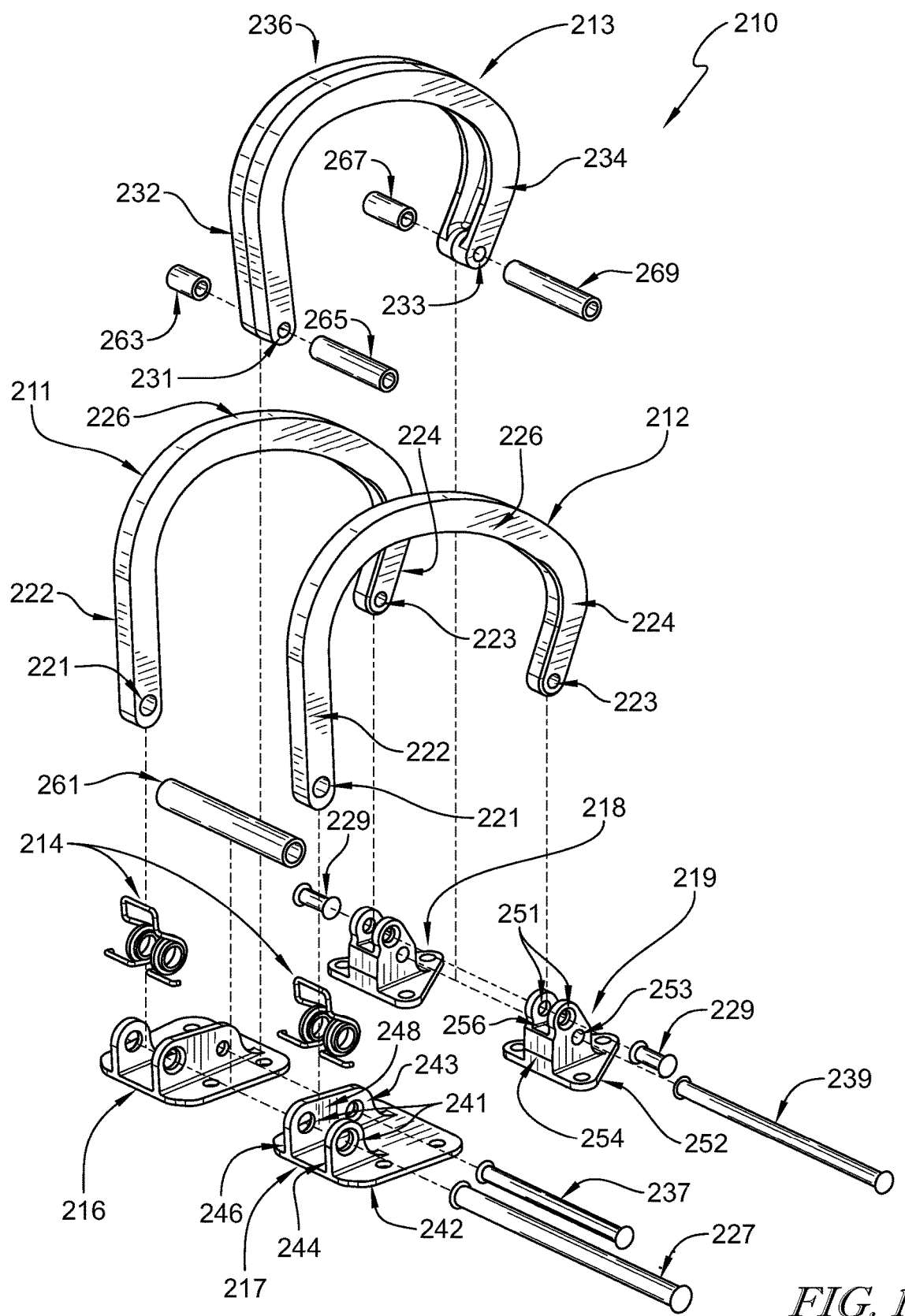
FIG. 17 is an exploded assembly view of the four-bar linkage hinge of FIG. 16.

Another embodiment of a four-bar linkage hinge 210 in accordance with the present disclosure used to is shown in FIGS. 15 and 16. Hinge 210 supports access door 106 relative to body panel 102 of airframe 100 for movement between the closed position covering opening 104 and opened position displaced from opening 104 as suggested in FIGS. 20-24. Four-bar linkage hinge 210 includes outer support links 211, 212 and a central control link 213 coupled between body brackets 216, 217 and door brackets 218, 219 as shown in FIGS. 16 and 17. Body brackets 216, 217 are secured to body panel 102 (such as with fasteners) and door brackets 218, 219 are secured to access door 106 (such as with fasteners). In some embodiments, more or less support links 211, 212 and control links 213 can be used for strength and alignment, but at least one support link 211, 212 and at least one control link 213 are used in each hinge 210 for coordinating movement of access door 106 between the closed and opened positions as further explained below.

Links 211, 212, 213 are rotatable relative to body brackets 216, 217 about axes $A_1$, $A_3$, respectively, and door brackets 218, 219 is rotatable relative to links 211, 212, 213 about axes $A_2$, $A_4$, respectively, as suggested in FIG. 16. Axes $A_1$, $A_2$, $A_3$, $A_4$ are offset from one another to allow door brackets 218, 219 (and attached access door 106) to rotate relative to links 211, 212, 213 as links 211, 212, 213 rotate relative to body brackets 216, 217 attached to body panel 102. In some embodiments, a rotation of support links 211, 212 about axis $A^1$ by about 70 degrees to about 80 degrees results in a rotation of access door 106 through an angle of about 160 degrees to about 180 degrees from the closed position to the opened position as suggested in FIGS. 18-24. The relative positions of axes $A_1$, $A_2$, $A_3$, $A_4$ and relative sizes of links 211, 212, 213 can be adjusted to adjust the rotation angle of access door 106.

In the illustrative embodiments, links 211, 212, 213 and brackets 216, 217, 218, 219 are spaced apart from one another by sleeves 261, 263, 265, 267, 269 as shown in FIG. 16. An extended width of hinge 210 allows a single hinge 210 to be used for guiding movement of access door 106 relative to body panel 102 as suggested in FIGS. 20-24. In some embodiments, a width of hinge 210 can be adjusted for use with different sized access doors. In some embodiments, more hinges 210 can be used with different sized access doors and axes $A_1$, $A_2$, $A_3$, $A_4$ of each hinge 210 being parallel to one another so that opening of the access door is smooth.

Similar to hinges 10 shown in FIGS. 1-14, hinge 210 allows for an extended range of motion of access door 106 while being attached on an inside of airframe 100 as suggested in FIGS. 20-24. The extended range of motion of access door 106 minimizes a profile of access door 106 in the opened position so that access door 106 is out of the path of other moving components.

In the illustrative embodiment, each support link 211, 212 includes a rear arm 222 and a forward arm 224 connected together by a neck 226 as shown in FIG. 17. Holes 221, 223 are formed through arms 222, 224, respectively. Control link 213 includes a rear arm 232 and a forward arm 234 connected together by a neck 236. Holes 231, 233 are formed through arms 232, 234, respectively. The configurations of links 211, 212, 213 allow links 211, 212, 213 to reach out and around opening 104 to position door brackets 218, 219 (and attached access door 106) along an outside of body panel 102 as suggested in FIG. 20-24.

Body brackets 216, 217 each include a base 242 and spaced apart flanges 244, 246 extending upward from base 242 to define a channel 248 as shown in FIG. 17. Rear holes 241 and forward holes 243 are formed through flanges 244, 246. Door brackets 218, 219 each include a base 252 and a column 254 extending upward from base 252. A slot 256 is formed through an upper portion of column 254. Holes 251 are formed through column 254 and extend across slot 256. A hole 253 extends through column 254 below slot 256.

In one illustrative embodiment, hinge 210 is assembled as shown in FIG. 17. Arms 222 of support links 211, 212 and springs 214 are received in channels 248 of body brackets 216, 217. A fastener 227 (such as a rivet) extends through holes 221 of support links 211, 212, through springs 214, and through holes 241 of body brackets 216, 217 to connect support links 211, 212 and springs 214 with body brackets 216, 217. Fastener 227 extends through sleeve 261 used to separate body brackets 216, 217. Support links 211, 212 rotate about fastener 227 relative to body brackets 216, 217. Springs 214 engage with body brackets 216, 217 and support links 211, 212, respectively, to bias hinge 210 and access door 106 toward the opened position.

Arm 232 of control link 213 is arranged between body brackets 216, 217 as suggested in FIG. 16. A fastener 237 (such as a rivet) extends through hole 231 of control link 213 and through holes 243 of body brackets 216, 217 to connect control link 213 with body brackets 216, 217. Fastener 237 extends through sleeves 263, 265 used to separate body brackets 216, 217 and position control link 213 relative to body brackets 216, 217. Lengths of sleeves 263, 265 can be adjusted to adjust a relative position of control link 213 between body brackets 216, 217. Control link 213 rotates about fastener 237 relative to body brackets 216, 217. An extended width of control link 213 blocks lateral twisting of hinge 210.

Arms 224 of support links 211, 212 are received in slots 256 of door brackets 218, 219, and fasteners 229 (such as rivets) extend through holes 223 and through holes 251 to connect support links 211, 212 with door brackets 218, 219 as suggested in FIG. 16. Door brackets 218, 219 rotate about fasteners 229 relative to support links 211, 212. Arm 234 of control link 213 is arranged between door brackets 218, 219. A fastener 239 (such as a rivet) extends through hole 233 of control link 213 and through holes 253 of door brackets 218, 219 to connect control link 213 with door brackets 218, 219. Fastener 239 extends through sleeves 267, 269 used to separate door brackets 218, 219 and position control link 213 relative to door brackets 218, 219. Lengths of sleeves 267, 269 can be adjusted to adjust a relative position of control link 213 between door brackets 218, 219. Door brackets 218, 219 rotate about fastener 239 relative to control link 213.

Figure 18:
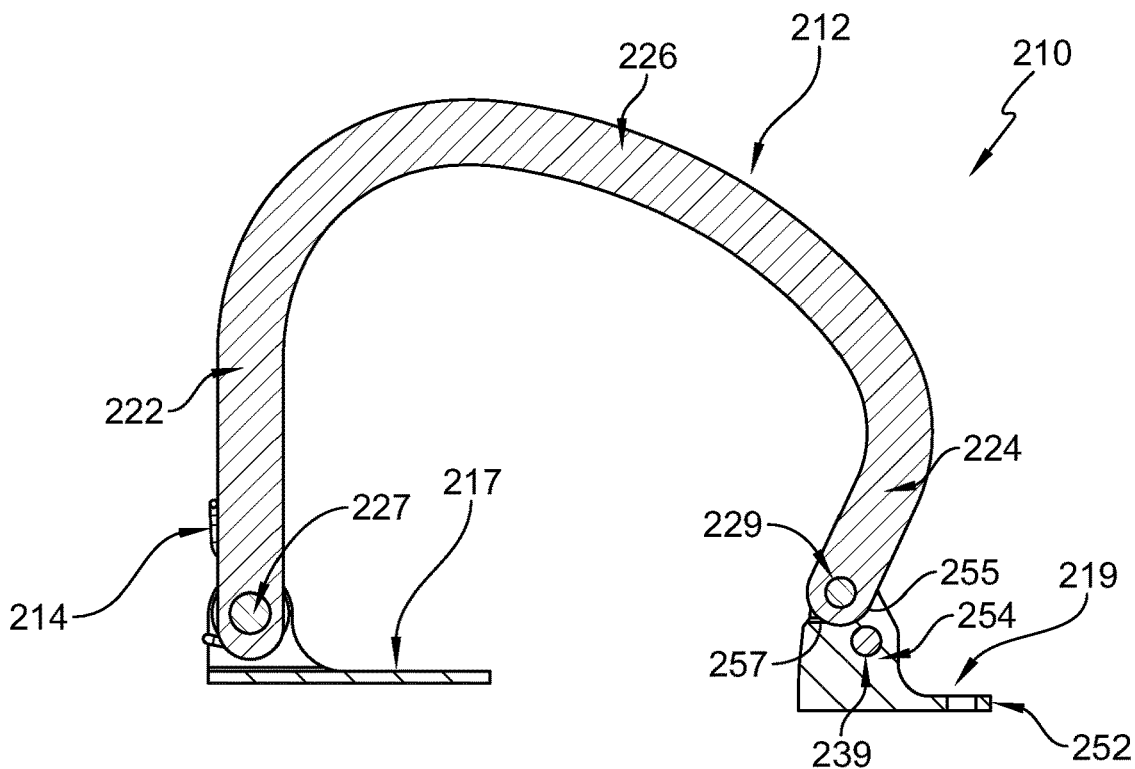
FIG. 18 is a sectional view taken along line 18-18 in FIG. 16 showing that the configuration of the four-bar linkage hinge when the access door is in the closed position and suggesting that the support links engage with a front stop on the door brackets when the access door is in the closed position.
Figure 19:
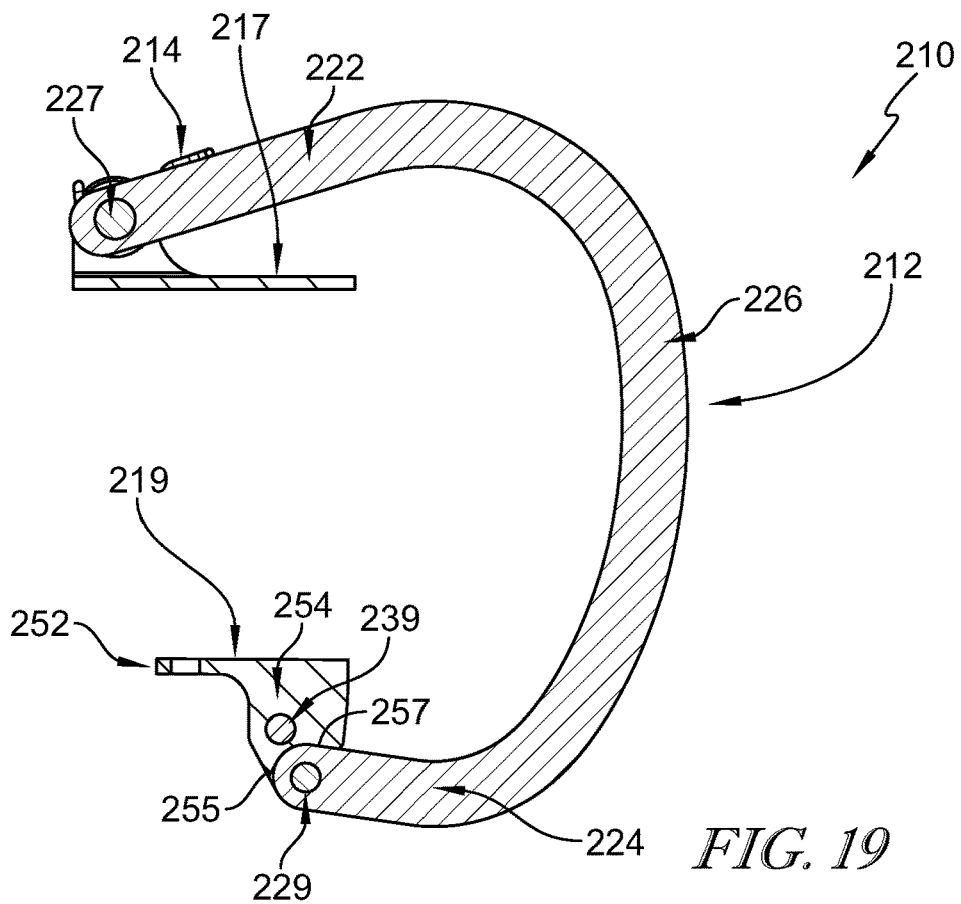
FIG. 19 is a similar view to FIG. 18 showing that the configuration of the four-bar linkage hinge when the access door is in the opened position and suggesting that the support links engage with a rear stop on the door brackets when the access door is in the opened position.
Figure 20:
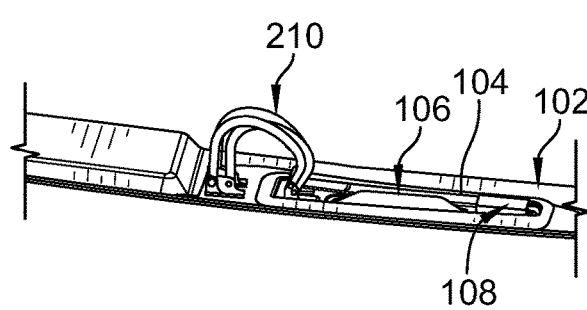
FIGS. 20-24 are a series of views illustrating movement of the access door from the closed position to the opened position.
Figure 21:
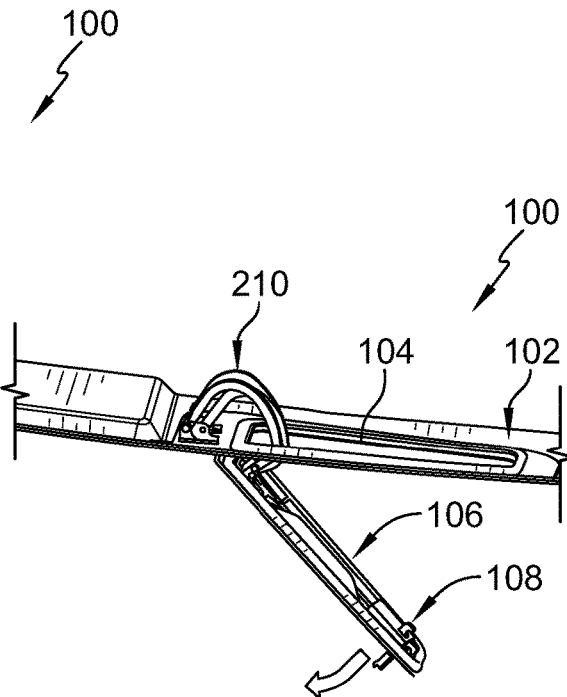
Figure 22:
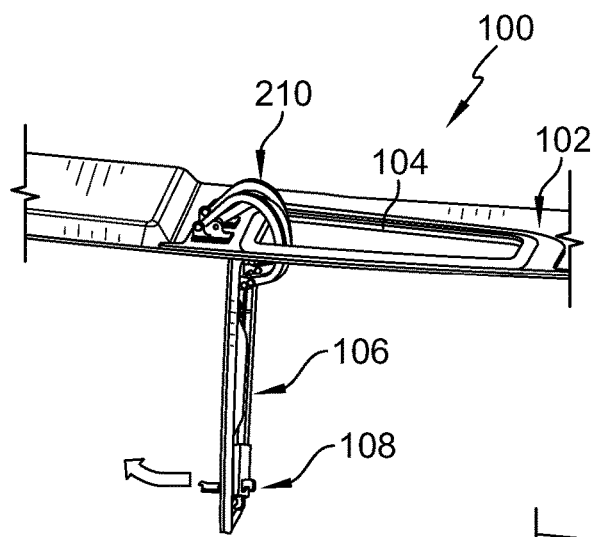
Figure 23:
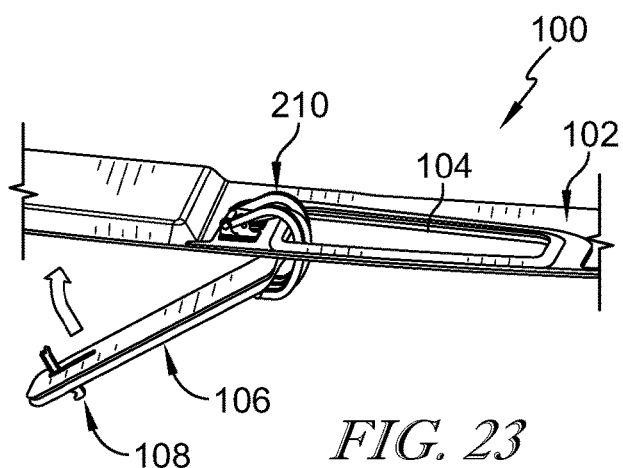
Figure 24:
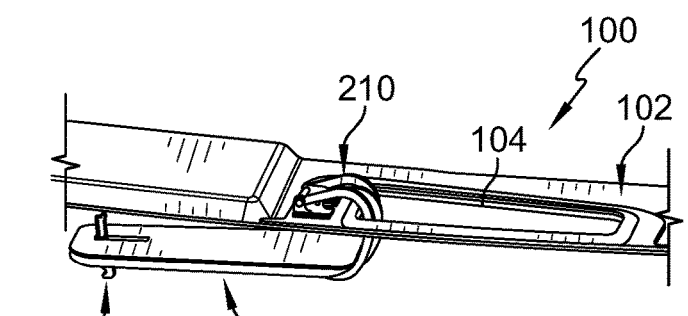

In one illustrative embodiment, hinge 210 is configured to move access door 106 through a path as suggested in FIGS. 20-24. In the closed position, shown in FIG. 20, access door 106 is received in opening 104 to block access to an interior of airframe 100 through opening 104. In the opened position, shown in FIG. 24, hinge 210 can block further rotation of access door 106 so that a handle portion of latch 108 is spaced apart from body panel 102 and does not contact body panel 102. Door brackets 218, 219 each define a front stop 255 and a rear stop 257 as shown in FIGS. 18 and 19. Support links 211, 212 engage with front stops 255 in the closed position and with rear stops 257 in the opened position to block rotation beyond the closed and opened positions. In some embodiments, airframe 100 is arranged such that access door 106 can move through a larger or shorter range of motion than illustrated in FIGS. 20-24. In the illustrative embodiment, hinge 210 provides complex rotational motion of access door 106 relative to body panel 102 much like a reverse folding action to position access door 106 in a low profile position along body panel 102 in the opened position.

In illustrative embodiments, FIG. 1 shows an aircraft structure 102 defining an exterior surface with a panel 106 attached to the structure 102 for selectively closing or covering an opening 104 in the structure 102. A latch 108 is provided on the panel 106 for engaging the panel 106 in a locked position over the opening 104 when in a closed position. While the latch 108 is shown on the panel 106, it could be possible to provide a configuration in which the latch 108 is carried on the structure 102 instead of the panel 106.

In illustrative embodiments, FIGS. 2 and 3 show the panel 106 disengaged from the opening 104 for allowing access to an area behind the structure 102 and accessible through the opening 104. The configuration of the exterior surface of the structure 102 and the panel 106 can be comprised of a generally symmetric or generally non-symmetric surface design such as comprised of a generally flat planar surface or a complex curvature surface. In either setting, the hinge assemblies 10 are used to provide support for the panel 106 when it is disengaged from the opening 104 and controlled, hinged movement of the panel 106 relative to the structure 102. In other words, regardless of the overall surface configuration and/or internal structures the hinge assemblies 10 can be configured to accommodate the opening and closing requirements.

In illustrative embodiments, as will be described in more detail with regard to FIGS. 7-14, the panel 106 movement generally allows for reliable disengagement and reengagement of the panel 106 relative to the opening 104 in a robust, secure, and repeatable manner. In other words, the design of the hinge assemblies 10 provide not only support for the panel 106 but also controlled operation of a complex rotary movement using the hinge assemblies 10 and their four-bar linkage configuration. This configuration prevents operator error as a result of over-opening, jamming, or canting of the components or structures of the hinge assemblies 10 compared to other unreliable designs.

In illustrative embodiments, additionally, the present configuration of the hinge assemblies 10 include biasing members 14, such as torsion springs, that are biased toward an open configuration. In other words, when the latch 108 is released the springs 14 bias the components of the hinge assemblies 10 in a manner to open the panel 106, or displace the panel 106 relative to the opening 104. This normally open spring configuration allows the panel 106 to be moved out of the way when opening 104 to prevent a partial opening which might interfere with the opening of another panel of the aircraft having a similar or intersecting path of movement. For example, if the hinge assemblies 10 of the present configuration displace the panel 106 away from the opening 104 the spring configuration moves it away from the opening 104 to fold over or open completely, nearly 180 degrees from its closed position, to allow for clearance of other panels which might be located near or intersecting the path of the present panel 106. It is assumed that if an operator can be in position to disengage the latch 108 the operator will be in a position to prevent interference between any other nearby panel. In this regard, the operator can disengage the latch 108 and allow the panel 106 of interest to be moved into the fully opened position (see FIG. 14). While the operator is in position to move the panel 106 the operator can block movement of any other panels across the path of rotation of the present panel 106. The gooseneck linkage configurations as will be described in greater detail below of the hinge assemblies 10 facilitate smooth and secure movement of the panel 106 relative to the structure 102.

In illustrative embodiments, with regard to FIG. 3, the panel 106 is displayed in the fully opened position with the hinge assemblies 10 fully extended orientations. As can be seen, the hinge assemblies 10 each include a linkage which extends all the way around from an interior surface of the structure 102 outwardly around the edge of the opening 104 to a position where the panel 106 is extended and supported in a position approximately 180 degrees from the closed position. The opened position can be configured to stop a few degrees short of 180 degrees so that any structures on the latch 108 will not come in contact with the exterior surface of the structure 102. On the interior surface of the structure 102, an envelope of operation can be defined as the space in which the mechanisms of the hinge assemblies 10 operate.

In illustrative embodiments, with regard to FIGS. 4 and 5, a representative hinge assembly 10 is shown in a perspective view (FIG. 4) and an exploded perspective view (FIG. 5). The hinge assembly 10 includes at least one control link 13, 15 (illustratively shown in a gooseneck shape) attached at a first end 32 to a frame bracket 16 and a second end 34 to a panel bracket 18. Similarly, a support link 12 (illustratively shown in a gooseneck shape) is attached at a first end 22 to the frame bracket 16 and at a second end 24 to the panel bracket 18. A pair of spaced apart control links 13, 15 are provided with the support link 12 positioned therebetween. This configuration is but one of many possible configurations which can be achieved according to the teaching of the present disclosure. A panel bracket knuckle structure 54 is provided on the panel bracket 18 and provides attachment points 51, 53 for attachment of the second end 24 of the support link 12 and the corresponding second ends 34 of the control links 13, 15. Rivets 29, 39 respectively engage corresponding holes 23, 33 of the corresponding links 12, 13, 15, respectively, to retain these ends of the corresponding links in the corresponding holes 51, 53, respectively.

In illustrative embodiments, retaining flanges 44, 46 are provided on the frame bracket 16 to retain corresponding ends 22, 32 of the support link 12 and control links 13, 15 by means of corresponding rivets 27, 37 extending through holes 21, 31, respectively, on the links 12, 13, 15 and holes 41, 43, respectively, on the bracket 16. Bushings can be positioned either side of the end 22 and with the rivet 27 extending therethrough in the assembled configuration. The spring 14 can also be retained over the bushings and extends on either side of the end 22 of the support link 12. The spring 14 engages with the flanges 44, 46 and with the end 22. As noted above, this spring 14 is configured to bias the hinge assembly 10 in an orientation that will open the panel 106 relative to the structure 102.

In illustrative embodiments, as shown in FIG. 4, an axis of rotation $A^1$ is provided projecting through the rivet 27, an axis of rotation $A_3$ extends through rivet 37, an axis $A_2$ extends through rivet 29, and an axis $A_4$ extends through rivet 39. These axes of rotation provide for rotary movement of the corresponding ends about the corresponding axes to provide complex interrelated generally rotary movement of the linkage captively retained in the corresponding brackets 16, 18 to provide the desired rotary motion. Further discussion will be provided below with regard to the operation and related motion of the panel 106 relative to the structure 102 as a result of these configurations.

In illustrative embodiments, a variety of hinge configurations can be achieved based on the teachings herein. Other configurations or numbers of links could be used similar to the present configuration to achieve the same results. In other words, a single support link 12 could be used in combination with a single control link 13 to provide the complex kinematic operation of the four-bar linkage type hinge for its intended application.

In illustrative embodiments, the spring 14 can be provided in a variety of configurations to bias the panel 106 open relative to the structure 102 as described herein, bias the panel 106 closed, or be eliminated. However, biasing the hinge assembly 10 toward the opened position is useful as mentioned above to help clear the panel 106 relative to the structure 102 to prevent interference with another panel which might cross through or otherwise intersect the path of movement of the panel, possibly causing damage to either or both panels.

In illustrative embodiments, as will be shown in the progressions of FIGS. 7-14, each hinge assembly 10 includes a stop protrusion 25 carried on a portion of the support link 12. In this configuration, as the support link 12 rotates about the axis of rotation $A^1$ extending axially through the rivet or pin 27, it extends in a maximum direction of rotation and is limited or stopped from further movement by the stop protrusion 25. The protrusion 25 can be formed of the same material as the link 12 or configured to provide material that might be shock absorbing or otherwise nondamaging to the corresponding frame bracket 16 surface against which it abuts. Additionally, a stop protrusion or other stop feature could be provided on the bracket to contact a corresponding portion of one of the control links 13, 15 as well as the support link 12.

In illustrative embodiments, the mounting portion of the brackets 16, 18 are shown having two different geometric configurations. In this regard, the panel bracket 18 has a generally triangular geometric shape whereas the frame bracket 16 has a generally rectangular shape. These configurations allow for attachment points be provided on the panel 106 having a triangular fastener hole pattern whereas a generally rectangular, four point hole pattern is provided on the frame 102. These different patterns provide a geometric indicator to signal to the installer to use the existing holes in the panel 106 or structure 102 to properly attach the corresponding bracket 16, 18.

In illustrative embodiments, the operation of the structures and the overall kinematics are described with regard to FIGS. 7-14. As shown in FIG. 7, the hinge assembly 10 is attached at the frame bracket 16 to the interior surface of the structure 102. The panel bracket 18 is attached to an inside surface of the panel 106. In this closed configuration, the latch 108 carried on the panel 106 is coupled to retain the panel 106 covering the opening 104 in a locked configuration. As shown in FIG. 8, a trigger of the latch 108 has been disengaged to disengage the latch 108 from the corresponding portion of the structure 102. In this configuration, as the panel 106 begins to open due to the open biasing effect of the spring 14 on the links 12, 13, 15 of the hinge assembly 10 cause displacement of a hinge side edge of the panel 106 to disengage a corresponding edge of the structure 102 near the opening 104 near the hinge side edge. This provides clearance between the panel 106 and the edge to prevent binding of the panel 106 against the opening edge. FIG. 9 shows the panel 106 continuing to open due to the spring 14 and the geometries of the links 12, 13, 15 act to displace the panel 106 away from the opening 104 but also maintain clearance of the panel 106 and at least the panel bracket 18 from binding or touching any portions of the structure 102.

In illustrative embodiments, with regard to FIGS. 10 and 11, the links 12, 13, 15 and the corresponding axes of rotation function to continue to pivot the panel 106 away from the structure 102 with the linkage reaching outwardly away from the edge without contacting the edge. After the door has reached approximately a 90 degree angle relative to a portion of the exterior surface of the structure 102 (such as shown in FIG. 10), the configuration of the links 12, 13, 15 allow for continued pivoting at the panel bracket 18. While the control links 13, 15 have relatively small rotational motion at the frame bracket 16 the support link 12 can continue to pivot approximately another 45 degrees. This allows for continued rotation of the end 24 on the panel bracket 18 causing the panel bracket to rotate about the axis A₄ relative to the ends 34 of the control links 13, 15. This causes the panel 106 to continue to rotate and orient itself in a more parallel fashion to the exterior surface of the structure 102.

In illustrative embodiments, as shown in FIGS. 12-14, an angle between panel 106 and structure 102 continues to progressively decrease from FIG. 12 through FIG. 14. The configuration of the links 12, 13, 15 continues to prevent contact between any of the surfaces or edges of the panel 106 against the structure 102. When the panel 106 reaches the fully opened position in FIG. 14, the angle between the exterior surface of the structure 102 and a corresponding opposing surface of the panel 106 has been reduced to approximately 2-10 degrees. Some angular dimension or clearance is provided so as to prevent the trigger on the latch 108 from contacting the exterior surface of the structure 102. If the trigger was not present or did not protrude from the panel 106, the angle between the panel 106 and the structure 102 could be effectively zero.

In illustrative embodiments, as previously discussed, a stop protrusion 25 is provided on the support link 12 to provide a hard stop of the rotation of the links 12, 13, 15 about the brackets 16, 18. Regardless of where the stop feature 25 is positioned, this provides a hard stop to prevent continued rotation of the links 12, 13, 15 and to prevent binding, contact or other undesired result of the links 12, 13, 15 and the structure 102.

In illustrative embodiments, with regard to the configuration shown in FIG. 14, the panel 106 is in the maximum opened position thereby minimizing the risk of contact with another panel moving through the path of rotation. To return the panel 106 to the closed position, the operator moves the panel 106 in an opposite direction from that shown in FIGS. 7-14 (effectively moving from the position shown in FIG. 14 to the position shown in FIG. 7). Once again, this requires the space through which the panel 106 will rotate about the hinge assemblies 10 to be relatively clear such that any other panel which might otherwise move through this volume used for rotation of the panel 106 is not in the way at the time of closing the panel 106. The panel 106 is urged by an operator against the spring force to close the panel. In this operation, the links 12, 13, 15 follow the reverse path of movement and rotation to rotate into a position whereby the panel 106 covers the opening 104. As the panel 106 is being closed, the hinge side edge of the panel 106 is brought into rotational positioning to avoid binding against the hinge side edge of the opening 104 thereby allowing the operator to securely close the panel 106 against the opening 104 and reengage the latch 108 and securely lock the latch by engagement of the trigger. A variety of latch configurations can be used to lock and unlock the panel 106.

In illustrative embodiments, a hinge assembly having a four-bar linkage configuration is disclosed for use in retaining and displacing a panel relative to a structure. The hinge assembly includes links that allow for rotational displacement of the panel attached to the hinge assembly relative to a structure also attached to the hinge assembly whereby movement of the panel does not interfere with the structure and does not contact the structure even though the panel can be displaced approximately 180 degrees in the opened position relative to the closed position. The hinge assembly is spring loaded to bias the panel to which it is attached into an opened position and the panel includes a latch for secure retention of the panel in a closed position.

The following numbered clauses include embodiments that are contemplated and non-limiting:

Clause 1. A four-bar linkage hinge comprising
    a first bracket;
    a second bracket spaced apart from the first bracket;
    a support link coupled to the first bracket and coupled to the second bracket; and
    a control link coupled to the first bracket and coupled to the second bracket.

Clause 2. The four-bar linkage hinge of clause 1, any other clause, or any combination of clauses, wherein the support link is coupled to the first bracket for rotation about a first axis and coupled to the second bracket for rotation about a second axis.

Clause 3. The four-bar linkage hinge of clause 2, any other clause, or any combination of clauses, wherein the control link is coupled to the first bracket for rotation about a third axis and coupled to the second bracket for rotation about a fourth axis.

Clause 4. The four-bar linkage hinge of clause 3, any other clause, or any combination of clauses, wherein the first, second, third, and fourth axes are spaced apart from one another such that rotation of the support link relative to the first bracket causes rotation of the second bracket relative to the first bracket and relative to the support link.

Clause 5. The four-bar linkage hinge of clause 4, any other clause, or any combination of clauses, wherein the support link and the control link each include a first arm and a spaced apart second arm coupled together by a neck, wherein the first arms are coupled to the first bracket and the second arms are coupled to the second bracket.

Clause 6. The four-bar linkage hinge of clause 4, any other clause, or any combination of clauses, wherein the first bracket includes a base and a pair of spaced apart flanges extending outward from the base to define a channel therebetween.

Clause 7. The four-bar linkage hinge of clause 6, any other clause, or any combination of clauses, wherein at least a portion of the support link is received in the channel, and wherein at least a portion of the control link is positioned along one of the flanges outside of the channel.

Clause 8. The four-bar linkage hinge of clause 7, any other clause, or any combination of clauses, wherein a spring is engaged with the first bracket and the support link.

Clause 9. The four-bar linkage hinge of clause 6, any other clause, or any combination of clauses, wherein the second bracket includes a base and a column extending outward from the base, and wherein a slot is formed at an opposing end of the column from the base.

Clause 10. The four-bar linkage hinge of clause 9, any other clause, or any combination of clauses, wherein at least a portion of the support link is received in the slot, and wherein at least a portion of the control link is positioned along the column outside of the slot.

Clause 11. A four-bar linkage hinge for use in supporting a first component for movement relative to a second component between a closed position covering an opening through the second components and an opened position displaced from the opening, the four-bar linkage hinge comprising
    a first bracket coupled to the second component;
    a second bracket coupled to the first component and spaced apart from the first bracket;
    a support link coupled to the first bracket and coupled to the second bracket; and
    a control link coupled to the first bracket and coupled to the second bracket.

Clause 12. The four-bar linkage hinge of clause 11, any other clause, or any combination of clauses, wherein the support link is coupled to the first bracket for rotation about a first axis and coupled to the second bracket for rotation about a second axis.

Clause 13. The four-bar linkage hinge of clause 12, any other clause, or any combination of clauses, wherein the control link is coupled to the first bracket for rotation about a third axis and coupled to the second bracket for rotation about a fourth axis.

Clause 14. The four-bar linkage hinge of clause 13, any other clause, or any combination of clauses, wherein the first, second, third, and fourth axes are spaced apart from one another such that rotation of the support link relative to the first bracket causes rotation of the first component relative to the second component and relative to the support link.

Clause 15. The four-bar linkage hinge of clause 14, any other clause, or any combination of clauses, wherein the support link and the control link each include a first arm and a spaced apart second arm coupled together by a neck, wherein the first arms are coupled to the first bracket and the second arms are coupled to the second bracket.

Clause 16. The four-bar linkage hinge of clause 14, any other clause, or any combination of clauses, wherein the first bracket includes a base and a pair of spaced apart flanges extending outward from the base to define a channel therebetween.

Clause 17. The four-bar linkage hinge of clause 16, any other clause, or any combination of clauses, wherein at least a portion of the support link is received in the channel, and wherein at least a portion of the control link is positioned along one of the flanges outside of the channel.

Clause 18. The four-bar linkage hinge of clause 17, any other clause, or any combination of clauses, wherein a spring is engaged with the first bracket and the support link to bias the first component toward the opened position.

Clause 19. The four-bar linkage hinge of clause 16, any other clause, or any combination of clauses, wherein the second bracket includes a base and a column extending outward from the base, and wherein a slot is formed at an opposing end of the column from the base.

Clause 20. The four-bar linkage hinge of clause 19, any other clause, or any combination of clauses, wherein at least a portion of the support link is received in the slot, and wherein at least a portion of the control link is positioned along the column outside of the slot.

Clause 21. The four-bar linkage hinge of clause 20, any other clause, or any combination of clauses, wherein rotation of the support link relative to the first bracket by about 70 degrees to about 80 degrees results in a rotation of the first component through an angle of about 160 degrees to about 180 degrees from the closed position to the opened position.

Clause 22. An airframe comprising
a body panel;
an access door; and
a four-bar linkage hinge coupled to the body panel and to the access door, the four-bar linkage hinge configured to support the access door for movement relative to the body panel between a closed position covering an opening through the body panel and an opened position displaced from the opening.

Clause 23. The airframe of clause 22, any other clause, or any combination of clauses, wherein the four-bar linkage hinge comprises
a first bracket coupled to the second component;
a second bracket coupled to the first component and spaced apart from the first bracket;
a support link coupled to the first bracket and coupled to the second bracket; and
a control link coupled to the first bracket and coupled to the second bracket.

Clause 24. The airframe of clause 23, any other clause, or any combination of clauses, wherein the support link is coupled to the first bracket for rotation about a first axis and coupled to the second bracket for rotation about a second axis.

Clause 25. The airframe of clause 24, any other clause, or any combination of clauses, wherein the control link is coupled to the first bracket for rotation about a third axis and coupled to the second bracket for rotation about a fourth axis.

Clause 26. The airframe of clause 25, any other clause, or any combination of clauses, wherein the first, second, third, and fourth axes are spaced apart from one another such that rotation of the support link relative to the first bracket causes rotation of the access door relative to the body panel and relative to the support link.

Clause 27. The airframe of clause 26, any other clause, or any combination of clauses, wherein the support link and the control link each include a first arm and a spaced apart second arm coupled together by a neck, wherein the first arms are coupled to the first bracket and the second arms are coupled to the second bracket.

Clause 28. The airframe of clause 26, any other clause, or any combination of clauses, wherein the first bracket includes a base and a pair of spaced apart flanges extending outward from the base to define a channel therebetween.

Clause 29. The airframe of clause 28, any other clause, or any combination of clauses, wherein at least a portion of the support link is received in the channel, and wherein at least a portion of the control link is positioned along one of the flanges outside of the channel.

Clause 30. The airframe of clause 29, any other clause, or any combination of clauses, wherein a spring is engaged with the first bracket and the support link to bias the access door toward the opened position.

Clause 31. The airframe of clause 28, any other clause, or any combination of clauses, wherein the second bracket includes a base and a column extending outward from the base, and wherein a slot is formed at an opposing end of the column from the base.

Clause 32. The airframe of clause 31, any other clause, or any combination of clauses, wherein at least a portion of the support link is received in the slot, and wherein at least a portion of the control link is positioned along the column outside of the slot.

Clause 33. The airframe of clause 26, any other clause, or any combination of clauses, wherein rotation of the support link relative to the first bracket by about 70 degrees to about 80 degrees results in a rotation of the access door through an angle of about 160 degrees to about 180 degrees from the closed position to the opened position.

Clause 34. The four-bar linkage hinge of clause 1, any other clause, or any combination of clauses, further comprising a second control link coupled to the first bracket and the second bracket.

Clause 35. The four-bar linkage hinge of clause 1, any other clause, or any combination of clauses, further comprising a second support link coupled to the first bracket and the second bracket.

Clause 36. The airframe of clause 26, any other clause, or any combination of clauses, wherein the four-bar linkage hinge further comprises a second control link coupled to the first bracket and the second bracket.

Clause 37. The airframe of clause 26, any other clause, or any combination of clauses, wherein the four-bar linkage hinge further comprises a second support link coupled to the first bracket and the second bracket.

Clause 38. A four-bar linkage hinge comprising
a first pair of brackets;
a second pair of brackets spaced apart from the first pair of brackets;
a pair of support links coupled to the first pair of brackets and coupled to the second pair of brackets; and
a control link coupled to the first pair of brackets and coupled to the second pair of brackets.

Clause 39. The four-bar linkage hinge of clause 38, any other clause, or any combination of clauses, wherein the pair of support links are coupled to the first pair of brackets for rotation about a first axis and coupled to the second pair of brackets for rotation about a second axis.

Clause 40. The four-bar linkage hinge of clause 39, any other clause, or any combination of clauses, wherein the control link is coupled to the first pair of brackets for rotation about a third axis and coupled to the second pair of brackets for rotation about a fourth axis.

Clause 41. The four-bar linkage hinge of clause 40, any other clause, or any combination of clauses, wherein the first, second, third, and fourth axes are spaced apart from one another such that rotation of the pair of support links relative to the first pair of brackets causes rotation of the second pair of brackets relative to the first pair of brackets and relative to the pair of support links.

Clause 42. The four-bar linkage hinge of clause 41, any other clause, or any combination of clauses, wherein each support link and the control link each include a first arm and a spaced apart second arm coupled together by a neck, wherein the first arms are coupled to the first pair of brackets and the second arms are coupled to the second pair of brackets.

Clause 43. The four-bar linkage hinge of clause 41, any other clause, or any combination of clauses, wherein each bracket of the first pair of brackets includes a base and a pair of spaced apart flanges extending outward from the base to define a channel therebetween.

Clause 44. The four-bar linkage hinge of clause 43, any other clause, or any combination of clauses, wherein at least a portion of each support link is received in one of the channels, and wherein at least a portion of the control link is positioned between the brackets of the first pair of brackets.

Clause 45. The four-bar linkage hinge of clause 44, any other clause, or any combination of clauses, wherein a spring is engaged with at least one of the brackets of the first pair of brackets and at least one of the support links.

Clause 46. The four-bar linkage hinge of clause 43, any other clause, or any combination of clauses, wherein each bracket of the second pair of brackets includes a base and a column extending outward from the base, and wherein a slot is formed at an opposing end of the column from the base.

Clause 47. The four-bar linkage hinge of clause 46, any other clause, or any combination of clauses, wherein at least a portion of each support link is received in one of the slots, and wherein at least a portion of the control link is positioned between the brackets of the second pair of brackets.

Clause 48. The four-bar linkage hinge of clause 41, any other clause, or any combination of clauses, further comprising one or more sleeves positioned between the brackets of the first pair of brackets and configured to space the brackets of the first pair of brackets apart from one another.

Clause 49. The four-bar linkage hinge of clause 41, any other clause, or any combination of clauses, further comprising one or more sleeves positioned between the brackets of the second pair of brackets and configured to space the brackets of the second pair of brackets apart from one another.

Clause 50. The four-bar linkage hinge of clause 41, any other clause, or any combination of clauses, wherein the four-bar linkage hinge is configured to support a first component for movement relative to a second component between a closed position covering an opening through the second component and an opened position displaced from the opening.

Clause 51. The four-bar linkage hinge of clause 50, any other clause, or any combination of clauses, wherein the first pair of brackets are coupled to the second component and the second pair of brackets are coupled to the first component.

Clause 52. The four-bar linkage hinge of clause 50, any other clause, or any combination of clauses, wherein the first component is an access door and the second component is a body panel of an airframe.

Clause 53. The four-bar linkage hinge of clause 50, any other clause, or any combination of clauses, wherein rotation of the pair of support links relative to the first pair of brackets by about 70 degrees to about 80 degrees results in a rotation of the first component through an angle of about 160 degrees to about 180 degrees from the closed position to the opened position.

Clause 54. The four-bar linkage hinge of clause 50, any other clause, or any combination of clauses, wherein each bracket of the second pair of brackets includes a front stop and a rear stop, and wherein the pair of support links engage with the front stops in the closed position and engage with the rear stops in the opened position to block rotation of the first component past the closed and opened positions.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure.

What is claimed is:
1. A four-bar linkage hinge comprising:
a pair of first brackets, each first bracket including a base and a pair of spaced apart flanges extending outward from the base to define a channel therebetween;
a pair of second brackets spaced apart from the pair of first brackets;
a pair of support links coupled to the pair of first bracket for rotation about a first axis and coupled to the pair of second brackets for rotation about a second axis;
at least one control link coupled between the pair of first brackets for rotation about a third axis and coupled between the pair of second brackets for rotation about a fourth axis; and
at least one spring,
wherein the first, second, third, and fourth axes are spaced apart from one another such that rotation of the support links relative to the pair of first brackets causes rotation of the pair of second brackets relative to the pair of first brackets and relative to the pair of support links,
wherein at least a portion of each support link of the pair of support links is received in a respective one of the channels, and wherein the at least one spring is received in one of the channels, the spring is engaged with one of the first brackets and one of the support links, and the spring is configured to bias the engaged support link relative to the engaged first bracket.

2. The four-bar linkage hinge of claim 1, wherein the support links and the at least one control link each include a first arm and a spaced apart second arm coupled together by a neck, wherein the first arms are coupled to the pair of first brackets and the second arms are coupled to the pair of second brackets.

3. The four-bar linkage hinge of claim 1, wherein each second bracket of the pair of second brackets includes a base and a column extending outward from the base, and wherein a slot is formed at an opposing end of the column from the base.

4. The four-bar linkage hinge of claim 3, wherein at least a portion of each support link is received in a respective one of the slots.

5. A four-bar linkage hinge for use in supporting a first component for movement relative to a second component between a closed position covering an opening through the second component and an opened position displaced from the opening, the four-bar linkage hinge comprising:
   a pair of first brackets coupled to the second component, each first bracket of the pair of first brackets including a base and a pair of spaced apart flanges extending outward from the base to define a channel therebetween;
   a pair of second brackets coupled to the first component and spaced apart from the pair of first brackets with the first component in the closed position;
   a pair of support links coupled to the pair of first brackets for rotation about a first axis and coupled to the pair of second brackets for rotation about a second axis, at least a portion of each support link received in a respective one of the channels; and
   at least one control link coupled between the pair of first brackets for rotation about a third axis and coupled between the pair of second brackets for rotation about a fourth axis,
   wherein the first, second, third, and fourth axes are spaced apart from one another such that rotation of the pair of support links relative to the pair of first brackets causes rotation of the first component relative to the second component and relative to the pair of support links.

6. The four-bar linkage hinge of claim 5, wherein the support links and the at least one control link each include a first arm and a spaced apart second arm coupled together by a neck, wherein the first arms are coupled to the pair of first brackets and the second arms are coupled to the pair of second brackets.

7. The four-bar linkage hinge of claim 6, wherein at least one spring is engaged with one of the first brackets and one of the support links and configured to bias the first component toward the opened position.

8. The four-bar linkage hinge of claim 5, wherein each second bracket of the pair of second brackets includes a base and a column extending outward from the base, and wherein a slot is formed at an opposing end of the column from the base.

9. The four-bar linkage hinge of claim 8, wherein at least a portion of each support link is received in a respective one of the slots.

10. The four-bar linkage hinge of claim 5, wherein rotation of the pair of support links relative to the pair of first brackets by 70 degrees to 80 degrees results in a rotation of the first component through an angle of 160 degrees to 180 degrees from the closed position to the opened position.

11. An airframe comprising:
   a body panel;
   an access door; and
   a four-bar linkage hinge coupled to the body panel and to the access door, the four-bar linkage hinge configured to support the access door for movement relative to the body panel between a closed position covering an opening through the body panel and an opened position displaced from the opening, the four-bar linkage hinge comprising:
      a pair of first brackets coupled to the body panel, each first bracket of the pair of first brackets including a base and a pair of spaced apart flanges extending outward from the base to define a channel therebetween;
      a pair of second brackets coupled to the access door and spaced apart from the pair of first brackets with the access door in the closed position;
      a pair of support links coupled to the pair of first brackets for rotation about a first axis and coupled to the pair of second brackets for rotation about a second axis, at least a portion of each support link received in a respective one of the channels; and
      at least one control link coupled between the pair of first brackets for rotation about a third axis and coupled between the pair of second brackets for rotation about a fourth axis,
   wherein the first, second, third, and fourth axes are spaced apart from one another such that rotation of the pair of support links relative to the pair of first brackets causes rotation of the access door relative to the body panel and relative to the pair of support links.

12. The airframe of claim 11, wherein the support links and the at least one control link each include a first arm and a spaced apart second arm coupled together by a neck, wherein the first arms are coupled to the pair of first brackets and the second arms are coupled to the pair of second brackets.

13. The airframe of claim 12, wherein at least one spring is engaged with one of the first brackets and one of the support links and configured to bias the access door toward the opened position.

14. The airframe of claim 11, wherein each second bracket of the pair of second brackets includes a base and a column extending outward from the base, and wherein a slot is formed at an opposing end of the column from the base.

15. The airframe hinge of claim 14, wherein at least a portion of each support link is received in a respective one of the slots.

16. The airframe of claim 11, wherein rotation of the pair of support links relative to the pair of first brackets by 70 degrees to 80 degrees results in a rotation of the access door through an angle of 160 degrees to 180 degrees from the closed position to the opened position.

* * * * *